(12) United States Patent
Hogl et al.

(10) Patent No.: US 8,600,878 B2
(45) Date of Patent: *Dec. 3, 2013

(54) METHOD FOR TRANSMITTING A CODE

(75) Inventors: Christian Hogl, Munich (DE); Josef Gundel, Aschheim (DE)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,056

(22) Filed: Sep. 13, 2012

(65) Prior Publication Data

US 2013/0006864 A1    Jan. 3, 2013

Related U.S. Application Data

(63) Continuation of application No. 13/236,304, filed on Sep. 19, 2011, now Pat. No. 8,301,556, which is a continuation of application No. 10/018,237, filed as application No. PCT/EP00/05359 on Jun. 9, 2000, now Pat. No. 8,024,260.

(30) Foreign Application Priority Data

Jun. 10, 1999 (DE) .................................. 199 26 472

(51) Int. Cl.
*G06Q 40/00* (2012.01)
(52) U.S. Cl.
USPC .................................. 705/38; 705/35; 705/40
(58) Field of Classification Search
USPC .................................. 705/38, 39, 40, 41, 43
See application file for complete search history.

(56) References Cited

U.S. PATENT DOCUMENTS

| 3,823,308 A | 7/1974 | Goldberg |
| 3,852,571 A | 12/1974 | Hall |
| 3,896,266 A | 7/1975 | Waterbury |
| 4,471,216 A | 9/1984 | Herve |
| 5,053,606 A | 10/1991 | Kimizu |
| 5,416,306 A | 5/1995 | Imahata |
| 5,532,464 A | 7/1996 | Josephson |

(Continued)

FOREIGN PATENT DOCUMENTS

| AU | 199928111 B2 | 2/2000 |
| AU | 200197079 B2 | 6/2002 |

(Continued)

OTHER PUBLICATIONS

"U.S. Appl. No. 09/901,954, Advisory Action mailed Mar. 3, 2006", 3 pgs.

(Continued)

*Primary Examiner* — Ojo O Oyebisi
(74) *Attorney, Agent, or Firm* — Schwegman Lundberg & Woessner, P.A.

(57) ABSTRACT

The present invention relates to a method for transmitting a code to a user in which the user transmits his or her financial account identifier information to a code allocation unit 3, the code allocation unit 3 transfers an amount of money to the financial institution 5 specified by the user and/or transfers an amount of money from the financial institution 5 specified by the user, thereby submitting the account identifier information and the code to be transmitted as additional information with this transfer and/or this debit, and the financial institution 5 forwards a receipt for the transfer and/or debit together with the additional information to the user.

20 Claims, 1 Drawing Sheet

(56) References Cited

U.S. PATENT DOCUMENTS

| | | | |
|---|---|---|---|
| 5,679,938 A | 10/1997 | Templeton | |
| 5,708,422 A | 1/1998 | Blonder et al. | |
| 5,750,972 A | 5/1998 | Botvin | |
| 5,770,843 A | 6/1998 | Rose | |
| 5,778,178 A | 7/1998 | Arunachalam | |
| 5,793,028 A | 8/1998 | Wagener | |
| 5,870,456 A | 2/1999 | Rogers | |
| 5,877,482 A | 3/1999 | Reilly | |
| 5,883,810 A | 3/1999 | Franklin et al. | |
| 5,903,878 A | 5/1999 | Talati et al. | |
| 5,907,801 A | 5/1999 | Albert | |
| 5,907,832 A | 5/1999 | Pieterse | |
| 5,963,917 A | 10/1999 | Ogram | |
| 5,987,500 A | 11/1999 | Arunachalam | |
| 6,029,150 A | 2/2000 | Kravitz | |
| 6,052,675 A | 4/2000 | Checchio | |
| 6,212,556 B1 | 4/2001 | Arunachalam | |
| 6,226,624 B1 | 5/2001 | Watson et al. | |
| 6,497,359 B1 | 12/2002 | Chihara | |
| 6,836,765 B1 | 12/2004 | Sussman | |
| 7,430,537 B2 | 9/2008 | Templeton et al. | |
| 8,024,260 B1 | 9/2011 | Hogl et al. | |
| 8,296,204 B2 | 10/2012 | Templeton et al. | |
| 8,301,556 B2 | 10/2012 | Hogl et al. | |
| 8,370,259 B2 | 2/2013 | Templeton et al. | |
| 2002/0077837 A1 | 6/2002 | Krueger et al. | |
| 2008/0312998 A1 | 12/2008 | Templeton et al. | |
| 2012/0030096 A1 | 2/2012 | Hogl et al. | |
| 2012/0054103 A1 | 3/2012 | Templeton et al. | |
| 2012/0054104 A1 | 3/2012 | Templeton et al. | |
| 2012/0109823 A1 | 5/2012 | Templeton et al. | |

FOREIGN PATENT DOCUMENTS

| | | | |
|---|---|---|---|
| DE | 4425271 A1 | 1/1996 | |
| DE | 19628045 A1 | 1/1998 | |
| DE | 19634418 A1 | 3/1998 | |
| DE | 19926472 A1 | 12/2000 | |
| DE | 10022973 A1 | 2/2001 | |
| EP | 0519843 A3 | 12/1992 | |
| EP | 0527639 A2 | 2/1993 | |
| EP | 0216521 B1 | 11/1993 | |
| EP | 0400911 B1 | 11/1996 | |
| EP | 0848360 A1 | 6/1998 | |
| JP | 2004519748 A | 7/2004 | |
| JP | 2008257747 A | 10/2008 | |
| JP | 2010124604 A | 6/2010 | |
| JP | 5005871 B2 | 6/2012 | |
| JP | 2012128885 A | 7/2012 | |
| WO | WO-9506294 A1 | 3/1995 | |
| WO | WO-9516971 A1 | 6/1995 | |
| WO | WO9638813 | * 12/1996 | |
| WO | WO-9638813 A1 | 12/1996 | |
| WO | WO9710560 | * 3/1997 | |
| WO | WO-9710560 A1 | 3/1997 | |
| WO | WO-9713228 A1 | 4/1997 | |
| WO | WO-9908242 A1 | 2/1999 | |
| WO | WO-9923622 A1 | 5/1999 | |
| WO | WO-9966436 A1 | 12/1999 | |
| WO | WO-0077754 A1 | 12/2000 | |
| WO | WO-0205224 A2 | 1/2002 | |
| WO | WO-0205224 A3 | 1/2002 | |

OTHER PUBLICATIONS

"U.S. Appl. No. 09/901,954, Advisory Action mailed Sep. 6, 2007", 3 pgs.

"U.S. Appl. No. 09/901,954, Appeal Brief filed May 11, 2006", 30 pgs.

"U.S. Appl. No. 09/901,954, Examiner Interview Summary mailed Feb. 5, 2008", 2 pgs.

"U.S. Appl. No. 09/901,954, Final Office Action mailed Jul. 10, 2007", 11 pgs.

"U.S. Appl. No. 09/901,954, Final Office Action mailed Dec. 19, 2005", 11 pgs.

"U.S. Appl. No. 09/901,954, Non Final Office Action mailed Jan. 21, 2005", 10 pgs.

"U.S. Appl. No. 09/901,954, Non Final Office Action mailed Feb. 13, 2007", 11 pgs.

"U.S. Appl. No. 09/901,954, Non Final Office Action mailed Dec. 19, 2007", 10 pgs.

"U.S. Appl. No. 09/901,954, Notice of Allowance mailed Jun. 19, 2008", 10 pgs.

"U.S. Appl. No. 09/901,954, Response filed Jan. 18, 2008 to Non Final Office Action mailed Dec. 19, 2007", 11 pgs.

"U.S. Appl. No. 09/901,954, Response filed Jan. 26, 2006 to Final Office Action mailed Dec. 19, 2005", 18 pgs.

"U.S. Appl. No. 09/901,954, Response filed Feb. 28, 2005 to Non Final Office Action mailed Jan. 21, 2005", 15 pgs.

"U.S. Appl. No. 09/901,954, Response filed Mar. 14, 2006 to Advisory Action mailed Mar. 3, 2006", 3 pgs.

"U.S. Appl. No. 09/901,954, Response filed Mar. 27, 2007 to Non Final Office Action mailed Feb. 13, 2007", 19 pgs.

"U.S. Appl. No. 09/901,954, Response filed Aug. 20, 2007 to Final Office Action mailed Jul. 10, 2007", 20 pgs.

"U.S. Appl. No. 10/018,237, Advisory Action mailed Feb. 9, 2009", 4 pgs.

"U.S. Appl. No. 10/018,237, Advisory Action mailed Sep. 20, 2007", 3 pgs.

"U.S. Appl. No. 10/018,237, Appeal Brief filed Feb. 24, 2009", 27 pgs.

"U.S. Appl. No. 10/018,237, Appeal Brief mailed Oct. 29, 2007", 15 pgs.

"U.S. Appl. No. 10/018,237, Examiner's Answer to Appeal Brief mailed Jul. 15, 2010", 13 pgs.

"U.S. Appl. No. 10/018,237, Final Office Action mailed Apr. 4, 2007", 11 pgs.

"U.S. Appl. No. 10/018,237, Final Office Action mailed Sep. 8, 2008", 13 pgs.

"U.S. Appl. No. 10/018,237, Non Final Office Action mailed Aug. 3, 2006", 17 pgs.

"U.S. Appl. No. 10/018,237, Non-Final Office Action mailed Mar. 27, 2008", 3 pgs.

"U.S. Appl. No. 10/018,237, Notice of Allowance mailed May 13, 2011", 9 pgs.

"U.S. Appl. No. 10/018,237, Preliminary Amendment mailed May 31, 2006", 6 pgs.

"U.S. Appl. No. 10/018,237, Reply Brief filed Sep. 15, 2009", 8 pgs.

"U.S. Appl. No. 10/018,237, Response filed Jan. 3, 2007 to Non Final Office Action mailed Aug. 3, 2006", 8 pgs.

"U.S. Appl. No. 10/018,237, Response filed Jun. 27, 2008 to Non-Final Office Action mailed Mar. 27, 2008", 11 pgs.

"U.S. Appl. No. 10/018,237, Response filed Aug. 6, 2007 to Final Office Action mailed Apr. 4, 2007", 6 pgs.

"U.S. Appl. No. 10/018,237, Response filed Dec. 16, 2008 to Final Office Action mailed Sep. 8, 2008", 13 pgs.

"U.S. Appl. No. 10/018,237, Supplemental Appeal Brief filed Apr. 14, 2009", 27 pgs.

"U.S. Appl. No. 12/198,575, Non Final Office Action mailed Mar. 1, 2012", 9 pgs.

"U.S. Appl. No. 12/198,575, Notice of Allowance mailed Jun. 29, 2012", 12 pgs.

"U.S. Appl. No. 12/198,575, Response filed May 31, 2012 to Non Final Office Action mailed Mar. 1, 2012", 9 pgs.

"U.S. Appl. No. 13/236,304, Non Final Office Action mailed Nov. 8, 2011", 6 pgs.

"U.S. Appl. No. 13/236,304, Notice of Allowance mailed Jun. 11, 2012", 9 pgs.

"U.S. Appl. No. 13/236,304, Response filed Feb. 7, 2012 to Non Final Office Action mailed Nov. 8, 2011", 6 pgs.

"U.S. Appl. No. 13/291,146, Non Final Office Action mailed Apr. 13, 2012", 8 pgs.

"U.S. Appl. No. 13/291,146, Notice of Allowance mailed Oct. 3, 2012", 11 pgs.

"U.S. Appl. No. 13/291,146, Response filed Jul. 13, 2012 to Non Final Office Action mailed Apr. 13, 2012", 7 pgs.

(56) References Cited

OTHER PUBLICATIONS

"U.S. Appl. No. 13/291,398, Non Final Office Action mailed Oct. 16, 2012", 8 pgs.
"U.S. Appl. No. 13/291,412, Non Final Office Action mailed Jun. 29, 2012", 8 pgs.
"U.S. Appl. No. 13/291,412, Preliminary Amendment filed Nov. 28, 2011", 7 pgs.
"U.S. Appl. No. 13/291,412, Response filed Oct. 1, 2012 to Non Final Office Action mailed Jun. 29, 2012", 8 pgs.
"Australian Application No. 2008203005, Examiner's First Report on Patentability mailed Oct. 29, 2008", 2 pgs.
"Australian Application Serial No. 2001271968, Amended Statement of Grounds of Opposition and Particulars Related to Each Ground mailed Feb. 11, 2008", 11 pgs.
"Australian Application Serial No. 2001271968, Letter from Examiner mailed Nov. 19, 2007", 2 pgs.
"Australian Application Serial No. 2001271968, Letter to Examiner Dec. 17, 2007", 1 pgs.
"Australian Application Serial No. 2001271968, Letter to examiner mailed Oct. 15, 2007", 2 pgs.
"Australian Application Serial No. 2001271968, Notice of Acceptance mailed Mar. 2, 2007", 3 pgs.
"Australian Application Serial No. 2001271968, Notice of Opposition mailed Jun. 15, 2007", 1 pgs.
"Australian Application Serial No. 2001271968, Office Action mailed Feb. 8, 2008", 1 pg.
"Australian Application Serial No. 2001271968, Office Action mailed Nov. 15, 2005", 2 pgs.
"Australian Application Serial No. 2001271968, Office Action mailed Nov. 21, 2006", 2 pgs.
"Australian Application Serial No. 2001271968, Response filed Jan. 11, 2007 to Office Action mailed Nov. 21, 2006", 23 pgs.
"Australian Application Serial No. 2001271968, Response filed Jan. 25, 2008 to Statement of Grounds and Particulars mailed Jan. 10, 2008", 2 pgs.
"Australian Application Serial No. 2001271968, Response filed Oct. 12, 2006 to Office Action mailed Nov. 15, 2005", 20 pgs.
"Australian Application Serial No. 2001271968, Statement of Grounds of Opposition and Particulars Relating to Each Ground mailed Sep. 17, 2007", 8 pgs.
"Australian Application Serial No. 2001271968, Supplemental Response filed Oct. 25, 2006 to Office Action mailed Nov. 15, 2005", 17 pgs.
"Australian Application Serial No. 2008203005, Response filed Aug. 10, 2009 to Office Action mailed Oct. 29, 2008", 2 pgs.
"Canadian Application Serial No. 2,412,184, Response filed Feb. 29, 2008 to Office Action mailed Aug. 31, 2007", 21 pgs.
"Canadian Application Serial No. 2,412,184, Office Action mailed Jan. 3, 2007", 5 pgs.
"Canadian Application Serial No. 2,412,184, Office Action mailed Aug. 31, 2007", 5 pgs.
"Canadian Application Serial No. 2,412,184, Response filed May 30, 2007 to Office Action mailed Jan. 3, 2007", 16 pgs.
"European Application Serial No. 00942046.4-2221, Office Action mailed Apr. 30, 2007", w/translation, 6 pgs.
"European Application Serial No. 00942046.4-2221, Response filed Oct. 31, 2007 to Office Action mailed Apr. 30, 2007", 7 pgs.
"European Application Serial No. 00942046.4-2221, Written Statements Filed Nov. 30, 2010", 43 pgs.
"European Application Serial No. 01951030.4, Office Action mailed Jan. 20, 2006", 15 pgs.
"European Application Serial No. 01951030.4, Response filed Mar. 30, 2006 to Office Action mailed Jan. 20, 2006", 9 pgs.
"European Application Serial No. 01951030.4, Summons to Attend Oral Proceedings Jul. 9, 2012", 7 pgs.
"European Application Serial No. 01951030.4, Summons to Attend Oral Proceedings mailed Jul. 21, 2008", 7 pgs.
"European Application Serial No. 10158849.9, Extended European Search Report mailed Jun. 18, 2010", 7 pgs.
"European Application Serial No. 10158849.9, Response filed Jan. 20, 2011 to EP Search Report mailed Jun. 18, 2010", 4 pgs.
"International Application Serial No. PCT/EP00/05359, International Search Report mailed Nov. 16, 2000", 2 pgs.
"International Application Serial No. PCT/US01/21725, International Preliminary Examination Report mailed Dec. 10, 2004", 5 pgs.
"International Application Serial No. PCT/US01/21725, International Search Report mailed Aug. 29, 2002", 3 pgs.
"International Application Serial No. PCT/US01/21725, Written Opinion mailed Aug. 24, 2004", 4 pgs.
"Japanese Application Serial No. 2002-508754, Office Action mailed May 16, 2011", with English translation of claims, 7 pgs.
"Japanese Application Serial No. 2002-508754, Office Action mailed Nov. 29, 2011", with English translation of claims, 5 pgs.
"Japanese Application Serial No. 2002-508754, Preliminary Amendment mailed Jul. 2, 2008", with English translation of claims, 14 pgs.
"Japanese Application Serial No. 2002-508754, Response filed Mar. 29, 2012 to Office Action mailed Nov. 29, 2011", with English translation of claims, 9 pgs.
"Japanese Application Serial No. 2002-508754, Response filed Nov. 8, 2011 to Office Action mailed May 30, 2011", with English translation of claims, 9 pgs.
"Japanese Application Serial No. 2008-173992, Office Action mailed May 16, 2011", with English translation of claims, 3 pgs.
Automated Clearing House Rules, "A Complete Guide to Rules and Regulations Governing the ACH Network", The National Automed Clearing House Assocation, Herndon VA., (1999), OR 4, OR 10, OG 19, OG 46-48.
Automated Clearing House Rules, "A Complete Guide to Rules and Regulations Governing the ACH Network", The National Automed Clearing House Assocation, Herndon VA., (1999), 627 pgs.
Horne, Doak D., "Letter from Gowling Lafleur Henderson LLP to Park, Vaughan and Fleming LLP, Jul. 21, 2004", 3 pgs.
Oregon Department of Revenue, "ACH Debit Electronic Funds Transfer: Program Guide", [Online]. Retrieved from the Internet: <URL: http://www.dor.state.or.us/19forms/206-029.pdf>, (Feb. 1999), 8 pgs.
"U.S. Appl. No. 13/291,398, Response filed Jan. 16, 2013 to Non Final Office Action mailed Oct. 16, 2012", 10 pgs.
"U.S. Appl. No. 13/291,412, Notice of Allowance mailed Dec. 11, 2012", 11 pgs.
"Japanese Application Serial No. 2012-76621, Voluntary Amendment filed Jan. 30, 2013", with English translation of claims, 10 pgs.

\* cited by examiner

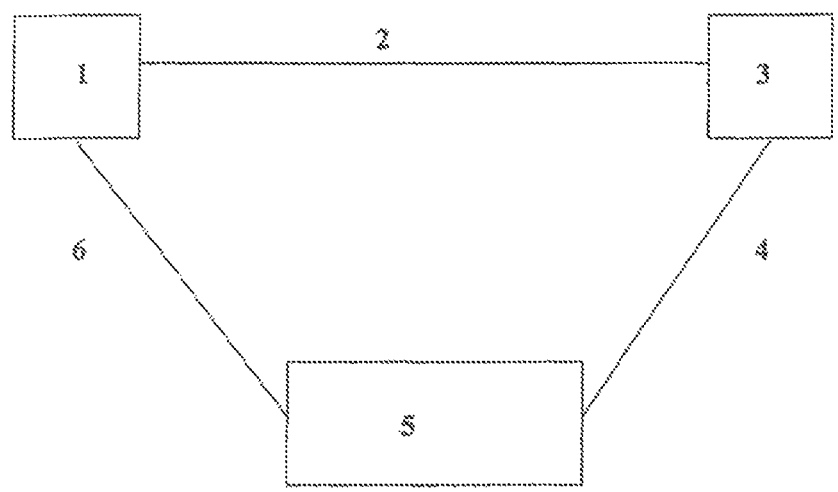

METHOD FOR TRANSMITTING A CODE

CROSS-REFERENCE TO RELATED APPLICATIONS

This application is a continuation application of U.S. Ser. No. 13/236,304 filed on Sep. 19, 2011, entitled "Method For Transmitting a Code, which is a continuation application of U.S. Ser. No. 10/018,237 filed on Jun. 24, 2002, entitled "Method For Transmitting a Code," which is a U.S. National Stage Filing under 35 U.S.C. 371 from International Patent Application No. PCT/EP00/05359 filed on Jun. 9, 2000, and published as WO 00/77754 A1 on Dec. 21, 2000, which in turn claims the priority benefit of German Application No. 199 26 472.4 filed on Oct. 6, 1999, the entire content of each application being incorporated herein by reference.

The present invention relates to a method for transmitting a code to a user.

Traditionally, companies offering services or selling goods are used to issuing personal codes to users who intend to buy or use the goods or services in order to facilitate identification of the users with the company. Furthermore, financial institutions, for example, are used to issuing personal identification numbers (PINs) to their customers to enable them to withdraw money from ATMs, conduct financial transactions, standing orders or use other services through a computer. Whenever a user initiates the first contact to such a company there is the problem of transmitting the personal code to him or her securely with minimal expense. Traditionally, personal codes will be handed over personally or sent by mail. Although both transmission methods are relatively secure, the expense associated with it is relatively high. It is either necessary to prepare a special tamper-proof letter, thereby ensuring that no third party can get information about the code without opening the letter, or the user has to show up in person with a company representative and submit a means of identification, for example his passport, in order to have his or her identity checked. Furthermore, companies, especially those offering online services, are used to transmitting personal codes via e-mail. Although this transmission method is very simple, it is also very insecure.

Once a personal code has been transmitted to a user, there is the additional problem of how to conduct future payment transactions with the user when he or she is buying or using the company's goods or services. The so-called direct debit method has been proven to be especially advantageous tor conducting payment transactions. With this method, the user agrees in advance to have amounts of money transferred from his or her bank corresponding to the goods or services bought or used, thereby eliminating the need to explicitly confirm every single transaction in the future. With this method, the company submits the user's financial account identifier and the amount to be transferred to the user's financial institution. This can be especially simply effected by an electronic storage media, for example a diskette, or by an online remote data connection. The financial institution verifies the financial account identifier information and, after positive verification, transfers the respective amount of money from the user's account to the company's account. For the company conducting this direct debit method, there is the problem of guaranteeing that all data submitted to the financial institution are correct. For example, if the financial account identifier information cannot be assigned to a valid bank account, the financial institution will reject the transaction and levy relatively high charges to the company. Consequently, with new users, there is the added problem of verifying financial account identifier information along with transmitting personal codes in order to prevent problems with future payment transactions. Such a verification is very expensive and difficult, especially for a company that neither has personal contact with a new user nor, for example, any means of physically checking his or her credit card or ATM card at least shortly. Consequently, companies are used to omitting verification of financial account identifier information provided by new users, thereby disadvantageously incurring the risk of fraud and invalid transactions.

It is therefore the object of the present invention to provide a method for transmitting a code to a riser which is secure, causes minimal expense and, therefore, costs associated with the transmission, and additionally provides a means for verifying financial account identifier information provided by the user.

This object is accomplished by the method according to claim 1, whereby advantageous modifications can be seen from the dependent claims.

According to the invention, the user transmits his or her financial account identifier information to a code allocation unit. Said code allocation unit transfers an amount of money to the financial institution specified by the user and/or transfers an amount of money from the financial institution specified by the user, thereby submitting the account identifier information and the code to be transmitted as additional information with this transfer and/or this debit. After having executed the transfer and/or the debit, the financial institution forwards a receipt for the transfer and/or debit together with the additional information to the user.

Advantageously, the invention provides a very secure transmission method. The secrecy of the transmission channel is guaranteed by the financial institution, as transaction details of the transfer or debit will not be divulged to any person outside a select group of confidential staff and, furthermore, only the legitimate user has access to his or her transfer or debit transaction receipts.

Furthermore, the method according to the invention provides a proof that the code has been transmitted to the account specified by the financial account identifier information through the additional information with the transfer or debit. The financial institution thus acts as an independent third party confirming the transaction. Consequently, the user will later not be able to repudiate having received the code. Thus, the transmission method according to the invention is almost equivalent to a registered letter, but less expensive and causes less effort.

In an advantageous embodiment of the invention, a verification unit of the financial institution, prior to executing the transfer and/or debit verifies the transfer and/or debit, data submitted by the allocation unit as to whether they can be assigned to a valid financial account of the user. In the case of a positive verification, the financial institution executes the transfer and/or debit initiated by the allocation unit. This measure ensures that the transfer and/or debit will not be executed unless there is a valid account of the user with the financial institution. For example, if his or her account is temporarily closed or non-existent, an invalid transaction can be avoided. Consequently, the method according to the invention obviates the need for separately verifying financial account identifier information or incurring future costs associated with invalid direct debit transactions.

Advantageously, in the case the verification of the financial account identifier information is negative, the verification unit of the financial institution transmits this result to the code allocation unit. In the code allocation unit, it can thus be decided whether to refrain from issuing a personal code to the user but rather contact him or her through another communication channel, if necessary.

Advantageously, the user furthermore submits identification data to the code allocation unit. These identification data are being submitted together with the account identifier information when initiating the transfer and/or debit. The verification unit verifies the identification data in combination with the account identifier information. Thus, not only the principal validity of the account identifier information can be verified, but also whether the account identifier information matches the specified user.

The transmission of the identification data anchor financial account identifier information of the user, the money transfer and/or debit and/or the transmission of the transfer or debit transaction receipt can advantageously be effected by a remote data connection. This can facilitate the method according to the invention very much. Furthermore, by using a remote data connection, the code can very quickly be transmitted to the user. The remote data connection can, for example, be effected through a computer network and/or an automatic telephone interface, for example an interactive voice response system.

In an advantageous embodiment of the method according to the invention, the code consists of at least two partial codes, whereby one code is being transmitted by the method according to the invention as an additional information with the transfer and/or debit and another partial code is being transmitted to the user by an alternate transmission method. This embodiment has the advantage that a third party, even in the case of getting access to the code transmitted by the method according to the invention, is being prevented from using it fraudulently, because the resulting code effectively used later consists of the at least two partial codes, Even if the other partial code is being transmitted by a relatively insecure method, such as the internet or the telephone, the probability of a third party getting access to both partial codes is very low. This embodiment thus provides a very secure code transmission method.

Advantageously, the identification data transmitted by the user to the allocation unit comprise at least the user's full name. Furthermore, the financial account identifier information transmitted by the user to the code allocation unit comprises at least the bank account number or credit card number and/or the name or bank code number of the financial institution or the credit card company.

Furthermore, the financial institution can also forward a transfer or debit transaction receipt to the allocation unit. Thus, through the receipts of the financial institution, not only the user, but also the party operating the code allocation unit will be advantageously provided with a means of proving the code transmission. This embodiment of the method according to the invention is almost equivalent to a registered letter with delivery confirmation, avoiding the drawbacks associated with sending letters.

Embodiments of the method according to the invention will be described in detail with references to the enclosed FIGURE.

The FIGURE schematically depicts a system for conducting the method according to the invention.

Reference number 1 refers to an input unit of a user intending to obtain a code from a company, for example, in order to use the company's services. The input unit can, for example, be a computer or a telephone system. The company features a code allocation unit 3. This code allocation unit 3 can, for example, be the company's central computer or a system of connected single computers. The code to be allocated can be any information submitted to a user in order to enable him to identify himself or herself to any party. The code can be a permanent personal access code such as a PIN. Furthermore, the code can be a one-time code such as a TAN (transaction number).

The user's input unit 1 and the company's allocation unit 3 are connected by some form of remote data connection 2. The remote data connection can, for example, be a computer network such as the internet or an automatic telephone interface such as an interactive voice response system. The user transmits his or her financial account identifier information through the input unit 1 via the remote data connection 2 to the code allocation unit 3. In this context, the term "financial account identifier information" refers to any collection of data that allow to establish some form of financial transaction with the user. The term "financial institution" generally refers to an entity through which financial transactions can be conducted. Obviously, the term also comprises a network of single institutions, for example the user's bank, the company's bank and for example, the ACH (Automated Clearing House). The financial transactions can thus be effected, for example, through an account with a financial institution, such as a bank or savings bank, or a credit card account. The financial account identifier information provided by the user comprises of his or her bank account number or credit card number and the name or bank code number of his or her financial institution or credit card company.

The code allocation unit 3 then transfers an amount of money to the financial institution specified by the user, thereby submitting the financial account identifier information and, if necessary, the user's identification data. After the new user's data have been transmitted, the money transfer can be effected automatically. Furthermore, the code to be transmitted is being transmitted as additional information with this transfer. The term "additional information" refers to any information transmitted in association with the money transfer. This information can be transmitted in unencrypted or encrypted form, additionally to the money transfer data or contained therein.

Such transmissions can, for example, be effected in the following ways: with a money transfer to a financial institution, a payment reference can be specified. This payment reference can indicate the code to be transmitted. Advantageously, a very small amount of money, for example EUR 1.00 is being transferred. Furthermore, the code to be transmitted can be contained within the amount of money to be transferred. For example, if the code 1498 is to be transmitted, an amount of EUR 14.98 could be transferred. The amount transferred can later be billed as an expense to the user. The money transfer can be effected through a remote data connection 4 between the code allocation unit 3 and the financial institution 5.

The financial institution 5 advantageously features a verification unit which verifies the money transfer data received from the code allocation unit as to whether they can be assigned to a valid financial account of the user. For example, it is being verified whether the account number exists and, if applicable, whether it exists for the specified user. In the case of a positive validation, the financial institution 5 executes the money transfer initiated by the allocation unit 3 and credits the respective amount of money to the users account. A receipt for the money transfer together with the additional information is being transmitted to the user via another connection 6, which can also be a remote data connection 6 such as a computer network or an automatic telephone interlace. Furthermore, it is possible to forward the receipt to the user by an account balance statement printer.

Additionally, the financial institution 5 can also forward a receipt for the money transfer to the allocation unit 3 in order to provide the party operating the code allocation 3 unit with a means of proving the code transmission.

The method according to the invention provides an especially simple way of transmitting a personal code to a new user. All the user has to know is how to extract the code from the additional information associated with the money transfer. This can be communicated by the company issuing the code or by another party, for example over the internet in a public forum.

Simultaneously with the transmission, it is verified that the financial account identifier information is correctly specified by the user, because only by doing so will he or she be able to receive the money transfer. This is especially important for future payment transactions between the user and the company offering services or selling goods. Furthermore, the user will receive his or her code very quickly, as the time needed for the transmission depends only on the time needed for the money transfer by the financial institution 5.

It is being remarked that the term "remote data connection" not only refers to an online connection, but also to offline connections, as long as some form of data transfer between the respective units is effected. For example, it could also be possible to ship data storage media.

If the verification unit of the financial institution 5 yields a verification result indicating that the account identifier information submitted is invalid, the financial institution 5 does not carry out the money transfer. Advantageously, this result is being transmitted to the verification and allocation unit via a remote data connection 4. In this case, it can thus be decided in the code allocation unit whether to initiate another contact to the user 1, for example through the remote data connection 2, or whether to retrain from issuing a personal code to the respective user.

In another embodiment of the method according to the invention, the code to be used later by the new user consists of two or more partial codes. For example, the first partial code represents the first four digits of the effective code and the second partial code represents the last four digits. The effective code could, for example, also be generated by multiplying the two partial codes or by applying some other computation known to the user. One partial code is being transmitted to the user using the method according to the invention and the other partial code or a plurality of other partial codes by an alternate transmission, method that may be not so secure. For example, the second partial code can be sent over a computer network such as the internet to the user.

This embodiment of the method provides an increased level of security, because an unauthorized person, even when getting access to the partial code transmitted by the method according to the invention, still has no information about the resulting code effectively used later. The probability of that person getting access to both or all partial codes is very low.

In another embodiment of the invention, the code transmission will be effected by a debit rather than a transfer of a small amount of money from the financial institution specified by the new user. With this debit as well, the account identifier information and as additional information, the code to be transmitted are specified. The method used in this embodiment of the invention corresponds to the method described above, whereby in each case a debit rather than a transfer is executed.

Furthermore, both a transfer and a debit of the same amount of money can be executed simultaneously. Although this method slightly increases the expense, however, it will have a neutral effect on the new user's account balance.

The invention claimed is:

1. A method comprising:
    receiving, from a code allocation unit, using at least one processor, a request to effect a value transfer utilizing a financial account identifier information of a user and an access code, the access code reflecting an amount of value associated with the value transfer, the amount of value being automatically selected by the code allocation unit;
    verifying that the financial account identifier information represents a valid financial account of the user; and
    effecting the requested value transfer only in response to a positive verification of the financial account identifier information representing a valid financial account of the user.

2. The method of claim 1, comprising transmitting the access code to the user together with a receipt for the value transfer.

3. The method of claim 1, comprising:
    in response to a negative verification of the financial account identifier information representing a valid financial account of the user, transmitting a result of the verification to the code allocation unit.

4. The method according to claim 1, wherein the value transfer is a money deposit transaction or a money withdrawal transaction.

5. The method according to claim 1, wherein the request to effect the value transfer is received via a remote data connection.

6. The method according to claim 1, wherein the transmitting of the access code is by one or more of a remote data connection and an account balance statement printer.

7. The method according to claim 6, wherein the remote data connection is a computer network or an automated telephone interface.

8. The method according to claim 1, wherein:
    the access code comprises at least two partial codes; and
    a first partial code from the at least two partial codes is to be transmitted to the user together with the receipt for the value transfer and a second partial code from the at least two partial codes is to be transmitted by an alternative method to the user.

9. The method according to claim 1, wherein the financial account identifier information comprises at least one of a group including:
    data associated with a bank account number; and
    data associated with a credit card number of the user.

10. The method according to claim 1, further comprising transmitting the receipt for the value transfer to the code allocation unit.

11. A non-transitory machine-readable storage medium having instruction data to cause a machine to:
    receive, from a code allocation unit, using at least one processor, a request to effect a value transfer utilizing a financial account identifier information of a user and an access code, the access code reflecting an amount of value associated with the value transfer, the amount of value being automatically selected by the code allocation unit;
    verify that the financial account identifier information represents a valid financial account of the user; and
    effect the requested value transfer only in response to a positive verification of the financial account identifier information representing a valid financial account of the user.

12. The machine-readable medium according to claim 11, comprising instruction data to cause a machine to transmit the access code to the user together with a receipt for the value transfer.

13. The machine-readable medium according to claim 11, comprising instruction data to cause a machine to transmit a result of the verification to the code allocation unit in response to a negative verification of the financial account identifier information representing a valid financial account of the user.

14. The machine-readable medium according to claim 11, wherein the value transfer is a money deposit transaction or a money withdrawal transaction.

15. The machine-readable medium according to claim 11, wherein the request to effect the value transfer is received via a remote data connection.

16. The machine-readable medium according to claim 11, wherein the transmitting of the access code is by one or more of a remote data connection and an account balance statement printer.

17. The machine-readable medium according to claim 11, wherein the remote data connection is a computer network or an automated telephone interface.

18. The machine-readable medium according to claim 11, wherein:
   the access code comprises at least two partial codes; and
   a first partial code from the at least two partial codes is to be transmitted to the user together with the receipt for the value transfer and a second partial code from the at least two partial codes is to be transmitted by an alternative method to the user.

19. The machine-readable medium according to claim 11, wherein the financial account identifier information comprises at least one of a group including:
   data associated with a bank account number; and
   data associated with a credit card number of the user.

20. The machine-readable medium according to claim 11, instruction data to cause a machine to transmit the receipt for the value transfer to the allocation unit.

\* \* \* \* \*

UNITED STATES PATENT AND TRADEMARK OFFICE
CERTIFICATE OF CORRECTION

PATENT NO. : 8,600,878 B2  
APPLICATION NO. : 13/615056  
DATED : December 3, 2013  
INVENTOR(S) : Hogl et al.

Page 1 of 1

It is certified that error appears in the above-identified patent and that said Letters Patent is hereby corrected as shown below:

In the Claims

In column 8, line 17, in claim 20, after "11," insert --comprising--, therefor

Signed and Sealed this  
Seventh Day of October, 2014

Michelle K. Lee  
*Deputy Director of the United States Patent and Trademark Office*